United States Patent [19]
Mraz

[11] Patent Number: 4,749,078
[45] Date of Patent: Jun. 7, 1988

[54] ROOF MOUNTED CONVEYOR IDLER FRAME

[75] Inventor: Dennis Mraz, Calgary, Canada

[73] Assignee: DM Enterprises Inc., Saskatoon, Canada

[21] Appl. No.: 906,828

[22] Filed: Sep. 12, 1986

[30] Foreign Application Priority Data

Sep. 13, 1985 [CA] Canada .................. 490661

[51] Int. Cl.$^4$ ............................. B65G 15/08
[52] U.S. Cl. .................... 198/830; 198/831; 198/861.1
[58] Field of Search ........... 198/830, 831, 809, 861.1, 198/861.2, 842, 632

[56] References Cited

U.S. PATENT DOCUMENTS

| | | |
|---|---|---|
| 623,377 | 4/1899 | Leger . |
| 1,929,325 | 10/1933 | Masterson . |
| 2,688,216 | 9/1954 | Lorig et al. . |
| 2,702,176 | 2/1955 | Dulle . |
| 2,773,257 | 12/1956 | Craggs et al. . |
| 2,842,257 | 7/1958 | Craggs et al. . |
| 2,851,151 | 9/1958 | McCallum . |
| 2,868,355 | 1/1959 | McCann . |
| 2,875,886 | 3/1959 | Lo Presti et al. . |
| 2,907,448 | 10/1959 | Gleeson ............... 198/842 X |
| 2,992,723 | 7/1961 | Poundstone . |
| 3,047,126 | 7/1962 | Ebner ............... 198/842 X |
| 3,062,360 | 11/1962 | Arndt et al. . |
| 3,077,258 | 2/1963 | Gianukos . |
| 3,191,759 | 6/1965 | Lo Presti . |
| 3,191,760 | 6/1965 | Herzog . |
| 3,200,938 | 8/1965 | Stinson . |
| 3,212,626 | 10/1965 | McLeish et al. ............... 198/830 X |
| 3,285,393 | 11/1966 | Johnson . |
| 3,292,771 | 12/1966 | Reilly . |
| 3,471,004 | 10/1969 | Ferlemann . |
| 3,793,682 | 2/1974 | Nelson . |
| 3,989,217 | 11/1976 | Friedman . |
| 4,037,098 | 7/1977 | Kowalski . |
| 4,127,252 | 11/1978 | Splawn . |
| 4,261,460 | 4/1981 | Peterson, II . |
| 4,475,648 | 10/1984 | Weeks ............... 198/830 |
| 4,476,975 | 10/1984 | Densmore ............... 198/861.1 X |

FOREIGN PATENT DOCUMENTS

| | | |
|---|---|---|
| 495574 | 9/1975 | Australia . |
| 732955 | 2/1943 | Fed. Rep. of Germany . |
| 738598 | 9/1943 | Fed. Rep. of Germany ...... 198/842 |
| 974858 | 5/1961 | Fed. Rep. of Germany ...... 198/830 |
| 1282548 | 11/1968 | Fed. Rep. of Germany ...... 198/830 |

*Primary Examiner*—Joseph E. Valenza
*Assistant Examiner*—Jonathan D. Holmes
*Attorney, Agent, or Firm*—Welsh & Katz, Ltd.

[57] ABSTRACT

Conveyor idler supports and spacing members are secured to a downwardly facing surface or framework, and adjusted laterally and vertically to facilitate accurate alignment of adjacent idlers in a series. Installation is facilitated, since accuracy in boring securing holes in the downwardly facing surface is less critical than with prior art conveyor support structures, in both the lateral and longitudinal directions. Also spacer assemblies are provided for accurately spacing adjacent idler supports.

16 Claims, 8 Drawing Sheets

ROOF MOUNTED CONVEYOR IDLER FRAME

FIELD OF THE INVENTION

This invention relates to idler frames for conveyors.

DESCRIPTION OF THE PRIOR ART

In mines, it is common practice to install conveyor belts for moving mined material from the workface to a mine shaft, where it can be loaded into an elevator to be removed from the mine. Some such conveyors are floor mounted, but in some situations roof mounted conveyor systems are desired to maximize the free floor area in the mine and to facilitate cleaning around and under the conveyors.

Roof mounted conveyor structures consist of sections of cable mounted hardward of 200 to 400 feet in length, comprising means to anchor two parallel tensioned cables at each end of each section, multiple intermediary roof mounted brackets with chain hangers to suspend the cables horizontally and conveyor idler frames mounted on and hanging from the wire ropes by various clamping and chain hanger means.

Such roof mounted structures require for installation accurate control survey reference lines longitudinally, because lateral adjustment of the support structure is impossible after initial installation. Extension of such structure is necessarily by "jumps" of 200 to 400 feet in length, and is labour intensive, requiring the accurate location and drilling of holes and assembly of structure components. Conveyor shut down time is required to complete the tie-in of a new section. These constraints prevent roof mounted structure from being used in extensible conveyor mining applications.

Consequently conveyor idler frames standing on the floor are often used, usually resulting in poor alignment of the frames, poor belt training because of uneven floor and/or side slopes, and frequent tipping over of stands with consequent material spillage, damage to the conveyor belt and production delays. Conventional roof mounted conveyor structure in mining is typically used only for loading at fixed locations along the side or at the tail end. Applications in which a variable or traversing loading point from the side is required dictate the aforesaid use of floor mounted conveyor structure with all of their inherent disadvantages to the mining operation.

SUMMARY OF THE INVENTION

The present invention seeks to overcome the above and other difficulties and provides, in a conveyor idler of the type comprising: first means for securing an idler frame to a downwwardly facing surface in an area wherein the conveyor is to be deployed; suspension means for mounting the idler frame to the first means, idler rollers mounted on the idler frame for supporting a conveyor belt; adjustment means for varying the location of the suspension means relative to the first means so that the idler frame is movable transversely of the conveyor belts; said adjustment means also providing for varying the height of the idler frame relative to the first means; whereby the first means may, during initial installation, be secured to the surface in an approximately correct location permitting adjustment of the suspension means to dispose the idler frame in line with adjacent idler frames and the conveyor belt centre line in both the horizontal and vertical planes.

According to another aspect of the invention, there is provided a system of conveyor idlers for suspension from a mine roof in a string, the system comprising: (i) hanger brackets for attachment transversely of a mine roof, each bracket having a plurality of chain attachment means spaced therealong, (ii) chain means for attachment to the chain attachment means at a selected location, (iii) frames means bearing idler rollers for attachment to the chain means for supporting a conveyor belt on its conveying reach; (iv) spacer rod means for connecting adjacent frame means in a string to maintain adjacent frame means at a fixed but adjustable spacing, (v) locking means on the frame means including means for distributing pressure from the locking means for detachably securing an end of a spacer rod to its respective frame, and return reach idler rollers secured to each frame means for supporting a conveyor belt on its return reach.

BRIEF DESCRIPTION OF THE DRAWINGS

Other features and characteristics of the invention will become apparent from the following specifications when read in conjunction with the accompanying drawings, in which.

DESCRIPTION OF THE PREFERRED EMBODIMENT

Figure 1:
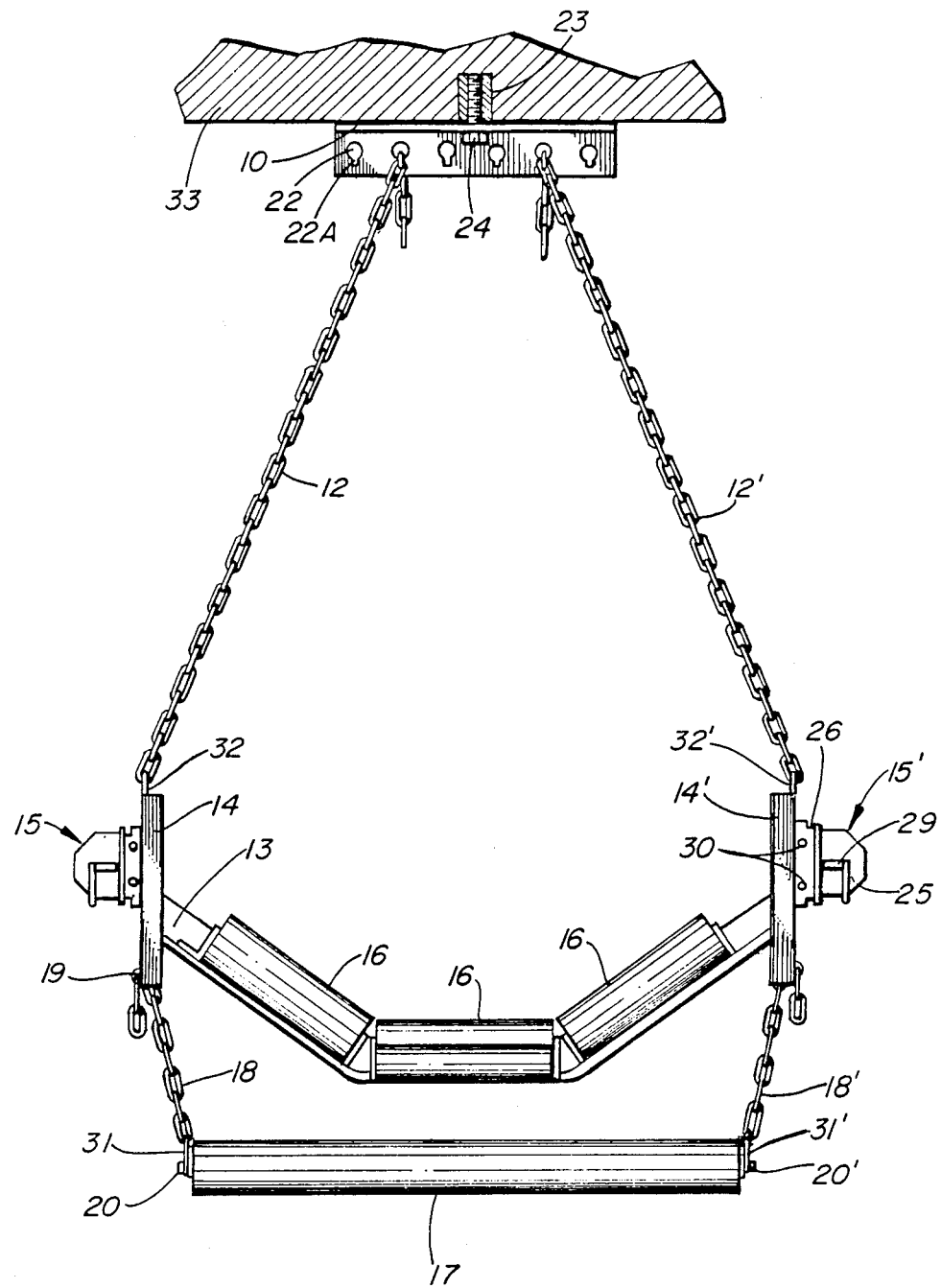
FIG. 1 is a front elevation of an enbodiment of a conveyor idler frame secured to a mine roof.

The first embodiment of the invention comprises an angle bar or bracket formed from steel stock 10 adapted to be secured by e.g. bolt 24 and anchor 23 to a mine roof 33. The bar or bracket 10 is adapted to be disposed transversely of the conveyor belt, and is provided with a series of keyhole-shaped slots 22 of basically circular configuration, with a downwardly depending slot 22a for receiving a chain link.

A pair of heavy chains 12, 12' are adapted to be passed one through each of the openings 22 so that individual links of the chain can drop into the slots 22a. The chains 12, 12' are thus locked in position, with vertical and horizontal location as required.

Secured to the lower ends of the two chains 12, 12' by eyes 32, 32' is a pair of inwardly facing steel channel elements 14, 14' bridged by a tubular roller support frame 13, welded to elements 14, 14'. In a manner known in the art, idler rollers 16 are mounted for free rotation on frame 13. The rollers 16 do not form part of the invention, are well known in the art and therefore they need not be described in detail.

In a pair of keyhole-shaped openings 19, 19' in the elements 14, 14' respectively are chains 18, 18' for supporting a return roller 17. The latter is journalled in known manner in steel fish plates 31, 31' secured to the lower ends of the chains 18, 18'.

Figure 2:
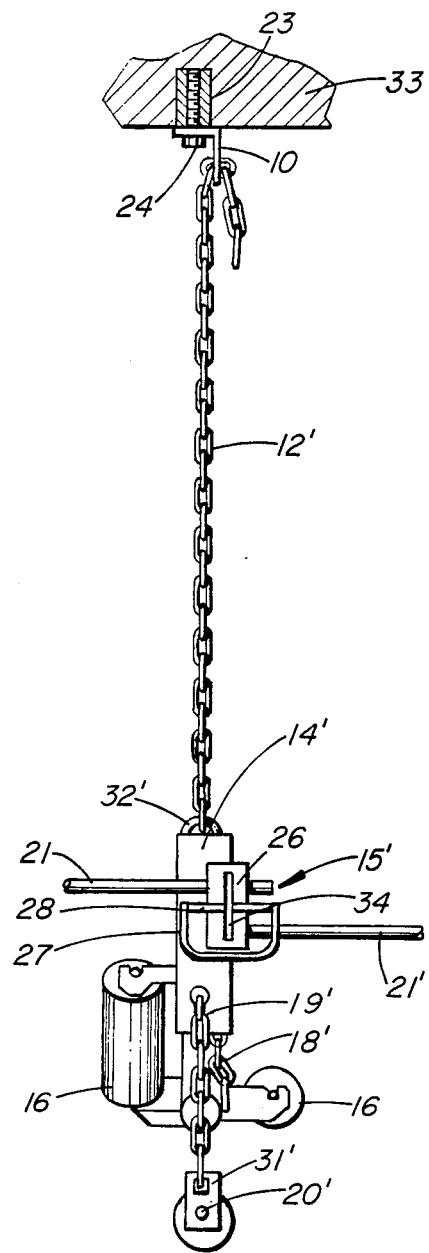
FIG. 2 is a side elevation of the embodiment of FIG. 1.
Figure 5:
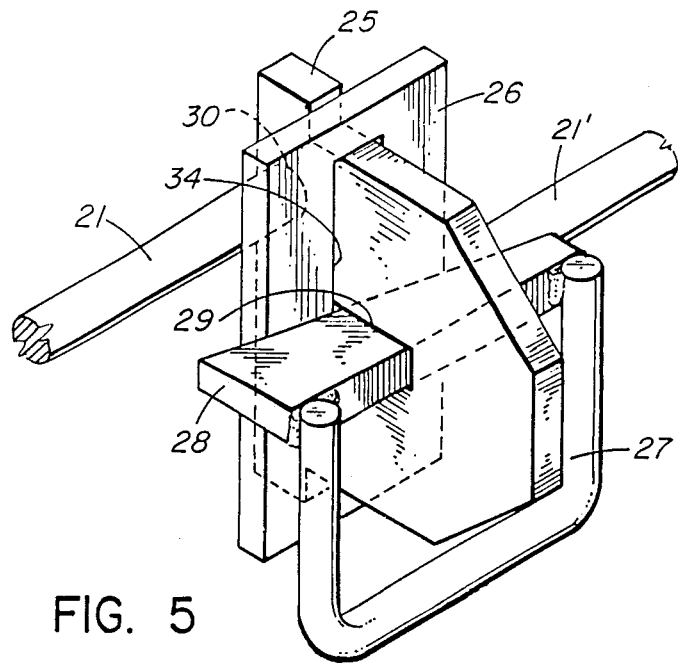
FIG. 5 is a detailed view of a wedge clamp for the spacer bars of FIGS. 1 and 3.

As can be seen more clearly from FIGS. 2, and 5, rigid spacer rods or bars 21, 21' are adapted to be secured by clamping assemblies 15, 15' to the sides of each idler frame to fix the distance, usually 5 feet, between adjacent idlers in a string in a mine. These spacer rods, which may be tubular, and are of nominal 6' length, are releasably attached to the elements 14, 14'. The clamping assemblies 15, 15' are identical on each side of the idler frame so that only one, 15', needs to be described.

Figure 3:
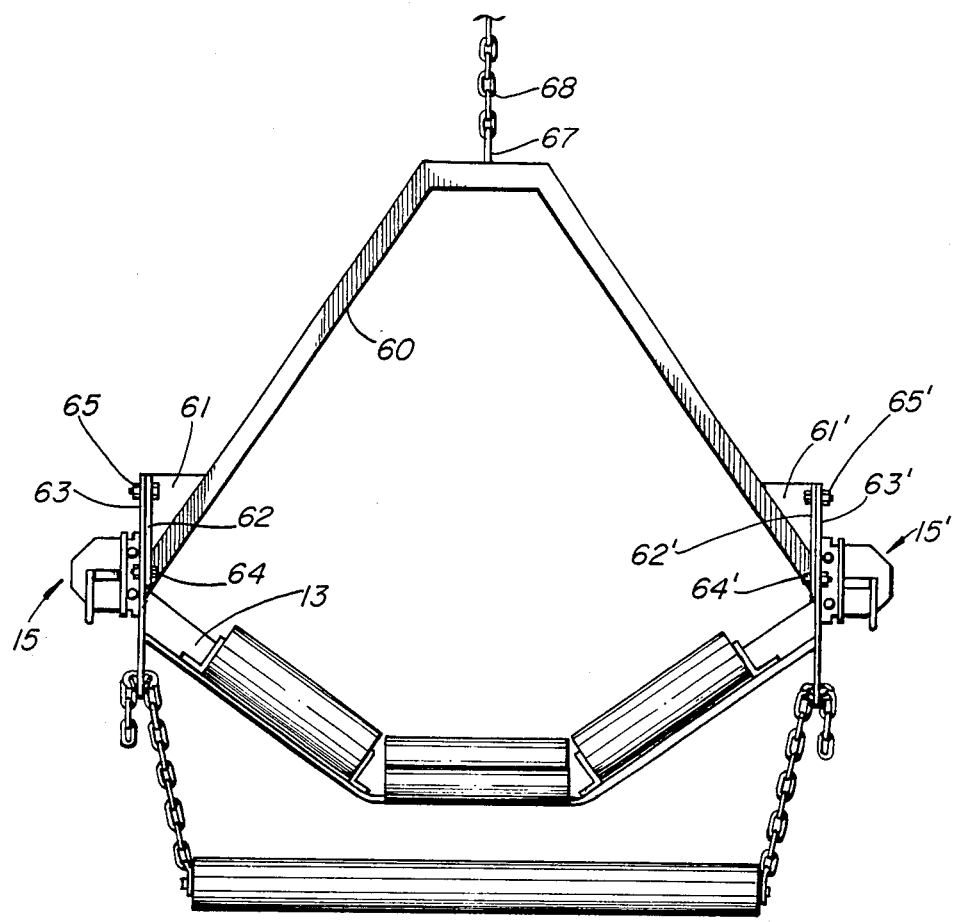
FIG. 3 is a front elevation of a second embodiment.
Figure 6:
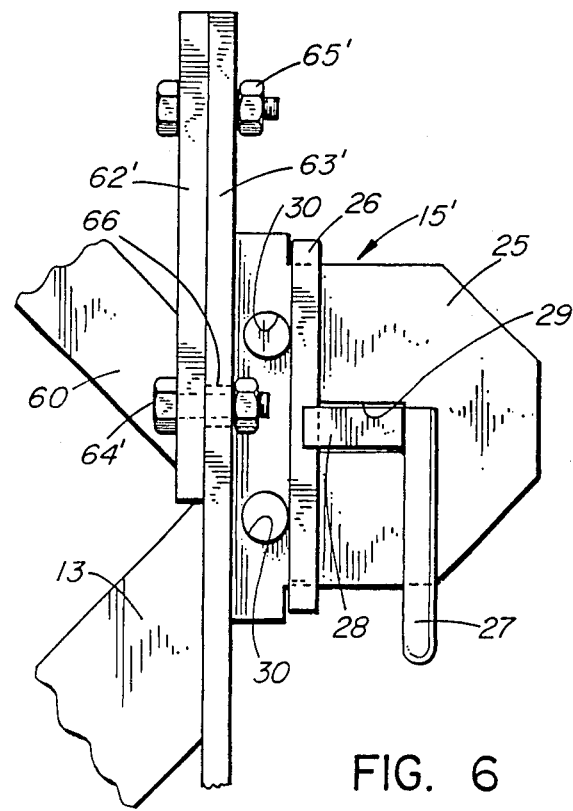
FIG. 6 is a detailed view of the frame pivot and wedge clamp attached to the embodiment of FIG. 3.

Securely welded to channel member 14', or plate 63' in the FIG. 3 embodiment, is a tongue 25 (FIGS. 5 and 6) which is provided with a pair of circular openings 30 closely adjacent the channel member 14' or plate 63'. These openings are adapted to receive the rods 21, 21', and while a pair of openings is disclosed, a single elongated slot may be provided.

A rectangular opening 29 is provided in the tongue, centrally between the openings 30.

A plate 26 is also provided, with a slot 34 therein of a size to mate with the cross-section of the tongue 25. The plate 26 is placed over the tongue where it may rest against the rods 21, 21'. A wedge 28, which engages in the slot 29, is then driven into position to lock the plate 26, and thus the rods 21, 21', firmly in position. Plate 26 comprises means serving to distribute pressure from the locking means, which specifically in this embodiment is provided by wedge 28 engaged in slot 29, for detachably securing the spacer rods 21, 21' to the idler frame.

In manufacture of this assembly, the tongue is first welded to an element 14 or 14' or a plate 63, 63'. Then, a plate 26 is placed over the tongue. A wedge 28 is inserted in the slot 29. Since wedges of this type are frequently lost in mining operations, it is necessary to ensure that it is not possible to remove the wedge any more than is desired, i.e., from its locking position to its release position. To prevent such loss, a U-shaped handle 27 is welded to the ends of the wedge 28 directly after the latter is placed in the slot and the plate 26 placed over the tongue 25. By this means an assembly is provided that freely permits disengagement or engagement of the wedge 28 without risk of its removal, and the removal of the plate 26, from the structure and their consequent loss.

Figure 7:
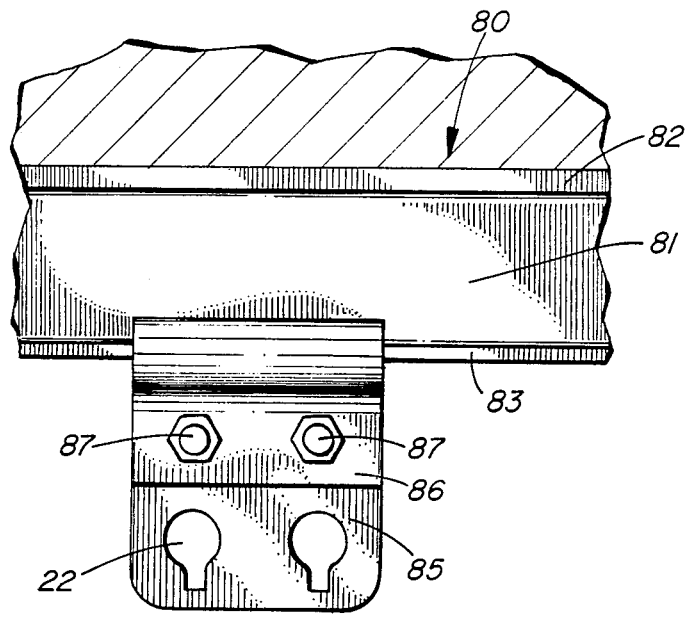
FIGS. 7 and 8 are alternative support means for the conveyor idler frame.
Figure 8:
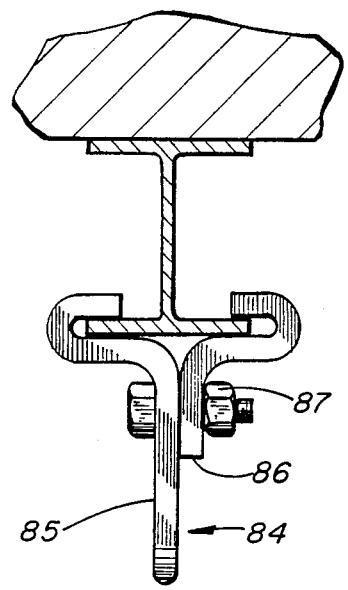

In FIGS. 7 and 8, there is disclosed an alternative method of securing the chains to a typical mine support structure (not shown) for transverse adjustment. In FIG. 7, an I-beam 80 of the support structure having a web 81 and upper and lower flanges 82 and 83 is a cross member of known support structure, and attached to the lower flange of the I-beam is a hanger comprising left hand and right hand elements 85 and 86 (FIG. 8) secured together by nuts and bolts 87 to engage the lower flange 83 of the I-beam securely. As in the embodiment of FIG. 1, keyhole shaped openings 22 are provided for securing a link of the chain. In this case, however, transverse adjustment is provided by loosening the bolts 87 and sliding the hanger along the lower flange of the I-beam.

It should be noted that both with the embodiment of FIG. 1, more than one anchor may be used, especially if the integrity of the mine roof 33 is in doubt.

Figure 4:
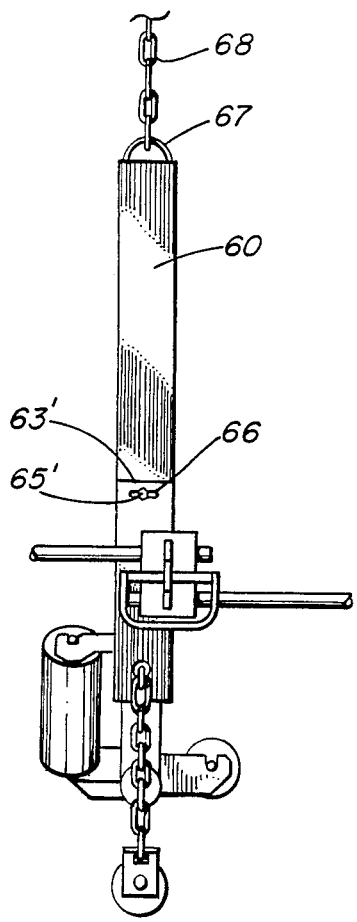
FIG. 4 is a side elevation of the embodiment of FIG. 3.

Turning now to the embodiment of FIGS. 3 and 4, the manner of attachment of the chain 68 to the mine roof is identical to that of the embodiments of FIGS. 1 and 2 or 7 and 8 and therefore will not be described. The embodiment of FIGS. 3 and 4 differs from the embodiment of FIG. 1 in two respects. A single chain 68 is used for suspension of the frame from the mine roof and the frame of FIG. 3 further comprises a downwardly facing U-shaped element 60, formed from structural stock, which is secured to idler frame 13 by means permitting limited pivotal movement of the idler frame 13 in relation to the element 60.

To the lower and outer portions of the legs of the frame 60 are welded plates 61, 61' having, at right angles thereto, flanges 62, 62'. Bolted to the flanges 62, 62' are plates 63, 63', the bolts being identified by the reference numerals 64, 64'. At the upper end of each of the plates 63, 63' the bolts 65, 65' engage in slots 66 (FIG. 4). Thus, by loosening the pairs of bolts, the plates 63, 63' may pivot about the bolts 64, 64' respectively to an extent limited by the length of the slot 66. Thus, if the mine roof slopes, provision is made for alteration of the angle of the idler roller frame to accommodate the slope of the mine roof within certain limits, typically 15°.

The construction and operation of the clamping assemblies 15, 15' in this embodiment is identical to that of the first embodiment and therefore will not be described in detail.

It will be obvious that the use of the single chain 68 to locate the complete idler assembly transversely of the mine shaft has the same function as that of FIG. 1, similarly, the adjustment of the height of the idler rollers by disposing appropriate chain links in the openings 22 will be obvious.

Figure 9:
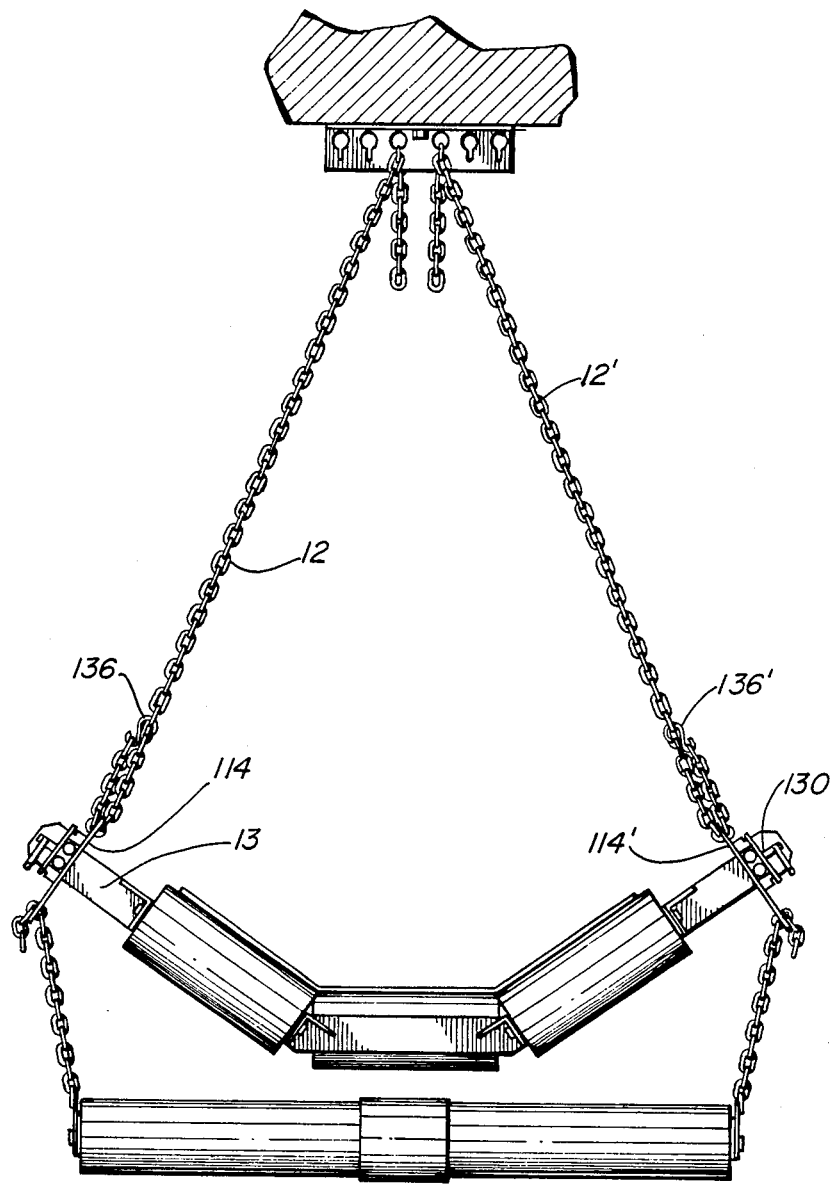
FIG. 9 is a front elevation of a third embodiment.
Figure 10:
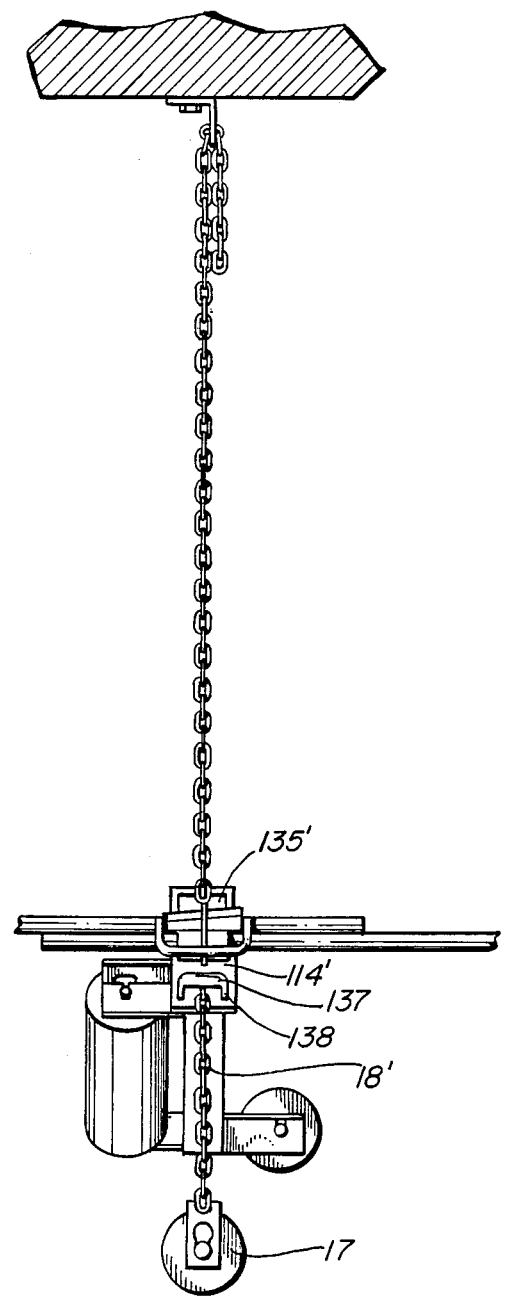
FIG. 10 is a side elevation of the embodiment of FIG. 9.

The embodiment illustrated in FIGS. 9 and 10 is generally similar to the embodiment of FIGS. 1 and 2, however, further means of adjustment are provided. To the extent that the embodiment of FIGS. 9 and 10 is similar to the embodiment of FIGS. 1 and 2, it will not be described and only the differences will be addressed.

In FIG. 9, it will be noted that the elements 14, 14' are replaced by plates 114, 114' which serve the same purpose as the elements 14, 14' but instead of being oriented generally vertically, they are welded to the frame 13 normal to the outer frame elements. As can be seen from FIG. 10, the plates 114, 114' include an upper opening 135 through which the chains 12, 12' can pass. At the terminal ends of the chains 12, 12' are secured hooks 136, 136'. Thus, a chain such as 12' can be passed through the opening 135' (FIG. 10) and the hook 136' secured through one of the links of the chain 12', providing for adjustment of the height of the respective side of the frame 13, link by link, supplementing the adjustment provided by selective use of the chain 12 or 12' and the keyhole slots 22 in the element 10.

A further difference in the embodiment of FIGS. 9 and 10 is in the lower portion of the plates 114, 114' which, as shown in FIG. 10, are provided at their lower ends with an opening 137 having a plurality of downwardly extending slots 138 for selectively receiving a chain link of the chain 18' that is used for suspending the returning idler 17. The combination of the openings 137, slots 138, and chain 18, 18' provide for rotation about a vertical axis of the point of suspension of the return idler 17 for precision of alignment of a conveyor belt on its return reach. It can thus be seen that in the embodiment of FIGS. 9 and 10, a desirable result is achieved in that four points of adjustment are provided for the main idler frame 13, i.e., the chains 12 and 12' can each be secured in a different opening 22 in the element 10 to provide for both lateral and vertical adjustment, and likewise the chains 12, 12' can be vertically adjusted in relation to the plates 114, 114' on the frame 13. The adjustment on the plates 114, 114' is much easier to carry out on the job in a mine where the roof 33 may be as high as 10 feet from the floor. Thus, if in operation it is perceived that a vertical adjustment is required, this can easily be carried out by supporting the frame 13, elevating it to loosen the respective chain, and securing a hook 136 or 136' in a higher or lower chain link. Likewise, in addition to providing for vertical adjustment of the return idlers 17 by selecting the appropriate link in the chains 18, 18' to insert in the openings in the elements 14 and 14', in the embodiment of FIGS. 9 and 10 the provision of, in effect, multiple hanging avoids potential problems caused by misalignment of the return idlers 17 in relation to the return reach of the conveyor belt, which problems can be dealt with by selecting the appropriate slot 138 from which to hang the chain 18 or 18'. Finally, it will be noted that in the embodiment of FIGS. 9 and 10, the two openings 30 for the spacer rods 21, 21' are as suggested earlier replaced by a slot 130 (FIG. 9) into which the two spacer rods 21, 21' are inserted prior to securing the plate 26 in position by driving in the wedge 28.

As is well known to those skilled in the art, idler frames of the general type disclosed above are normally spaced apart by 5 foot intervals. Thus, the spacer rods 21, 21' will have a nominal 6 foot length to allow for overlap and proper securement to the idler frames 13.

The rods may be bar stock, but are preferably three quarter inch standard pipe in all the embodiments described above.

It can thus be seen that the present invention provides an idler roller assembly that can be cheaply constructed, can readily be adjusted, precisely, vertically in relation to the mine shaft roof, and longitudinally and transversely of the mine shaft, without requiring any special skills on the part of the person installing the apparatus and without requiring special tools.

What we claim as our invention is:

1. In a conveyor idler of the type comprising:
   first means for securing an idler frame to a downwardly facing surface in an area wherein the conveyor is to be deployed;
   suspension means attached to said idler frame for mounting the idler frame to the first means,
   idler rollers mounted on the idler frame for supporting a conveyor belt;
   adjustment means for varying the location of the suspension means relative to the first means so that the idler frame is movable laterally of the conveyor belt;
   said adjustment means also providing for varying the elevation of the idler frame relative to the first means;
   spacer rod means for connecting the idler frame to an adjacent idler frame spaced therefrom, and
   locking means including locking pressure distributing means on the idler frame for detachably securing the spacer rod means to the idler frame,
   whereby the first means may, during initial installation, be secured to the surface in an approximately correct location permitting adjustment of the suspension means and the idler frame to dispose the idler frame in line with adjacent idler frames and the conveyor belt centre line in both the horizontal and vertical planes.

2. The conveyor idler defined in claim 1 wherein the first means is an angle bar adapted to be secured to the surface, the suspension means comprises a pair of chains engageable in slots in the angle bar and depending therefrom, the idler frame being secured to the chains, and the spacer rod means comprises at least one tubular spacer rod securable to the idler frame.

3. The conveyor idler defined in claim 2 wherein the frame comprises first and second portions, the first portion being secured to the chain or chains and the second portion comprising and idler roller support pivotably attached to the first portion.

4. The conveyor idler defined in claim 2 wherein the chains are adjustable in relation to the idler frame at the point of connection of the chains to the idler frame.

5. The conveyor idler defined in claim 4 further comprising return idlers for supporting a return reach of a conveyor belt, chains suspending the return idlers from the idler frame, means for adjusting the chains relative to the idler frame to adjust the height of the return idlers, said last named means further including means for adjusting the location of the return idlers about a vertical axis relative to the idler frame.

6. The conveyor idler defined in claim 5 wherein the means for adjusting comprise keyhole-shaped openings in which a chain link may engage.

7. A system of conveyor idlers for suspension from a mine roof in a string, the system comprising:
   (i) hanger brackets for attachment transversely of a mine roof, each bracket having a plurality of chain attachment means spaced therealong,
   (ii) chain means for attachment to the chain attachment means at a selected location,
   (iii) frame means bearing idler rollers for attachment to the chain means for supporting a conveyor belt on its conveying reach;
   (iv) spacer rod means comprising a plurality of spacer rods for connecting adjacent frame means in a string to maintain adjacent frame means at a fixed but adjustable spacing,
   (v) locking means including locking pressure distributing means on the frame means for detachably securing an end portion of at least one spacer rod to its respective frame means, and
   (vi) return reach idler rollers secured to each frame means for supporting a conveyor belt on its return reach.

8. A system as claimed in claim 7 wherein the chain attachment means of each hanger bracket comprises an opening therein for receiving a chain, and a slot extending downwardly from the opening for engaging a link of the chain to permit link-by-link vertical adjustment of the chain relative to the opening.

9. A system as claimed in claim 8 wherein the frame means are secured to lower ends of two chains, each chain being attached to one hanger bracket, whereby selective placement of the chains in the slots of the hanger bracket permits lateral adjustment of the frame means relative to the mine roof.

10. A system as claimed in claim 7 wherein the locking means comprise wedges engaging in wedge receiving openings at the lateral extremities of the frame means and plate means mating with the lateral extremities for wedging the spacer rods against a portion of the frame means.

11. a system as claimed in claim 7 wherein the locking means comprise wedges engaging in wedge receiving openings at the lateral extremities of the frame means for wedging the spacer rods against a portion of the frame means, said portion being defined by an opening or openings in the lateral extremities for receiving the spacer rods, and further comprising plate means mating with the lateral extremities, the plate means serving to distribute pressure resulting from driving the wedge means into the wedge receiving opening evenly against a pair of spacer rods.

12. A system as claimed in claim 7 wherein the locking means comprise wedges engaging in wedge receiving openings at the lateral extremities of the frame means for wedging the spacer rods against a portion of the frame means, said portion being defined by an opening or openings in the lateral extremities for receiving the spacer rods, and further comprising plate means mating with the lateral extremities, the plate means serving to distribute pressure resulting from driving the wedge means into the wedge receiving opening evenly against a pair of spacer rods, and means secured to the wedge means to prevent removal of the wedge means entirely from the wedge receiving opening.

13. A system as claimed in claim 8 wherein the frame means comprise a closed frame adapted to be suspended from its respective hanger bracket by a single chain.

14. The system defined in claim 7 wherein the chain means are adjustable in relation to the frame means at the point of connection of the chain means to the frame means.

15. The system defined in claim 14 wherein the return idler rollers are suspended from the idler frame by chains, and further comprising means for adjusting the chains relative to the frame means to adjust the height of the return reach idler rollers, said last named means further including means for adjusting the location of the idler rollers about a vertical axis relative to the frame means.

16. The conveyor idler defined in claim 15 wherein the means for adjusting comprise keyhole-shaped openings in which a chain link may engage.

* * * * *

UNITED STATES PATENT AND TRADEMARK OFFICE
CERTIFICATE OF CORRECTION

PATENT NO. : 4,749,078

DATED : June 7, 1988

INVENTOR(S) : Dennis Mraz

It is certified that error appears in the above-identified patent and that said Letters Patent is hereby corrected as shown below:

Column 1, line 17, "hardward" should be --hardware--.

Column 2, line 25, "enbodiment" should be --embodiment--.

Column 2, line 44, "Embodiment" should be --Embodiments--.

Column 6, line 63, "a system" should be --A system--.

Signed and Sealed this

Eighth Day of November, 1988

Attest:

DONALD J. QUIGG

Attesting Officer

Commissioner of Patents and Trademarks